United States Patent
Liu et al.

(10) Patent No.: US 10,327,613 B2
(45) Date of Patent: Jun. 25, 2019

(54) FILTERATION ASSEMBLY FOR VACUUM CLEANER AND VACUUM CLEANER HAVING SAME

(71) Applicant: JIANGSU MIDEA CLEANING APPLIANCES CO., LTD., Suzhou (CN)

(72) Inventors: Shenghui Liu, Suzhou (CN); Junying Niu, Suzhou (CN); Yan Zhao, Suzhou (CN); Qi Zhang, Suzhou (CN)

(73) Assignee: JIANGSU MEDIA CLEANING APPLIANCES CO., LTD., Suzhou (CN)

( * ) Notice: Subject to any disclaimer, the term of this patent is extended or adjusted under 35 U.S.C. 154(b) by 39 days.

(21) Appl. No.: 15/539,152

(22) PCT Filed: May 28, 2015

(86) PCT No.: PCT/CN2015/080121
§ 371 (c)(1),
(2) Date: Jun. 23, 2017

(87) PCT Pub. No.: WO2016/183863
PCT Pub. Date: Nov. 24, 2016

(65) Prior Publication Data
US 2018/0055319 A1  Mar. 1, 2018

(30) Foreign Application Priority Data

May 19, 2015  (CN) .......................... 2015 1 0255987
May 19, 2015  (CN) ..................... 2015 2 0324119 U

(51) Int. Cl.
*B01D 46/00*  (2006.01)
*A47L 9/20*  (2006.01)
(Continued)

(52) U.S. Cl.
CPC  *A47L 9/20* (2013.01); *A47L 9/10* (2013.01); *A47L 9/12* (2013.01); *B01D 46/0005* (2013.01);
(Continued)

(58) Field of Classification Search
CPC ....... A47L 9/10–19; A47L 9/20; B01D 46/00; B01D 46/0005; B01D 46/0065; B01D 46/0075; B01D 46/521; B01D 2279/55
(Continued)

(56) References Cited

U.S. PATENT DOCUMENTS

| | | | | |
|---|---|---|---|---|
| 4,600,420 A | * | 7/1986 | Wydeven | ............... B01D 46/10 264/136 |
| 2010/0043362 A1 | * | 2/2010 | Okada | ................... F24F 1/0007 55/296 |
| 2011/0299045 A1 | * | 12/2011 | Kotani | ............... B01D 46/0065 353/57 |

FOREIGN PATENT DOCUMENTS

| | | |
|---|---|---|
| CN | 102920395 A | 2/2013 |
| CN | 103068290 A | 4/2013 |
| | (Continued) | |

OTHER PUBLICATIONS

European Search Report dated Mar. 6, 2018 in the corresponding European application(application No. 15892242.7).
(Continued)

*Primary Examiner* — T. Bennett Mckenzie
(74) *Attorney, Agent, or Firm* — Kilpatrick Townsend & Stockton, LLP

(57) ABSTRACT

A filtration assembly (100) for a vacuum cleaner includes a filtration member (1) for filtering an impurity, in which an outer circumferential wall of the filtration member (1) is provided with a fixing frame (11) adapted to be fixed in the vacuum cleaner; and an ash tapping part (2) which includes a rack (21), a moving member (22), a gear (23) and a tapping
(Continued)

member (24). Two ends of the rack (21) are fixed to the fixing frame (11), the moving member (22) is movably disposed to the rack (21), the gear (23) is disposed to the moving member (22) and meshes with the rack (21), the tapping member (24) is disposed to the gear (23) through a connecting shaft (241) so as to be driven to rotate by the gear (23), and the tapping member (24) is configured to tap the filtration member (1) during rotation to vibrate the filtration member (1).

9 Claims, 4 Drawing Sheets

(51) Int. Cl.
*A47L 9/10* (2006.01)
*A47L 9/12* (2006.01)
*B01D 46/52* (2006.01)
(52) U.S. Cl.
CPC ....... *B01D 46/0075* (2013.01); *B01D 46/521* (2013.01); *B01D 2279/55* (2013.01)

(58) Field of Classification Search
USPC .................................................. 55/295–300
See application file for complete search history.

(56) References Cited

FOREIGN PATENT DOCUMENTS

| | | |
|---|---|---|
| CN | 103079443 A | 5/2013 |
| CN | 204618102 U | 9/2015 |
| DE | 752342 C | 2/1953 |
| EP | 3219238 A1 | 9/2017 |
| JP | 2008132274 A | 6/2008 |

OTHER PUBLICATIONS

CN First Office Action dated May 11, 2018 in the corresponding Chinese application(application No. 201510255987.6).

* cited by examiner

FILTERATION ASSEMBLY FOR VACUUM CLEANER AND VACUUM CLEANER HAVING SAME

CROSS REFERENCE TO RELATED APPLICATION

The present application is a National Stage of International Application No. PCT/CN2015/080121, filed May 28, 2015, which claims the priority and benefit of Chinese Patent Application No. 201510255987.6 and 201520324119.4, both filed on May 19, 2015, the contents of which are incorporated herein by reference in their entirety.

FIELD

The present disclosure relates to a field of cleaning tools, and also to a filtration assembly for a vacuum cleaner and the vacuum cleaner having the same.

BACKGROUND

At present, more and more families choose a vacuum cleaner as a cleaning tool. However, a filtration assembly will be gradually clogged by dust and dirt after used for some time, thereby leading to a decrease in a suction force and reducing cleaning efficiency.

In the related art, a slide rod is provided with a slide button, an interference fit is formed between the slide button and a HEPA paper, and the slide button stirs the HEPA paper by means of translation of the slide button on the slide rod, such that the dust adhered to the HEPA paper is vibrated to fall off to achieve a purpose of cleaning a filtration member. However, this structure will result in an increased fit clearance between the slide rod and the slide button due to the wear after a long period of use, and the slide button easily becomes loose and tensionless; in severe cases, the slide rod and the slide button will be stuck, which causes an abnormal operation and a great decrease in the cleaning efficiency.

SUMMARY

The present disclosure seeks to solve at least one of the problems existing in the related art to at least some extent. Thus, the present disclosure is to propose a filtration assembly for a vacuum cleaner, which can improve cleaning efficiency to some extent.

The present disclosure further discloses a vacuum cleaner having the foregoing filtration assembly.

The filtration assembly for the vacuum cleaner according to embodiments of the present disclosure includes a filtration member for filtering an impurity, in which an outer circumferential wall of the filtration member is provided with a fixing frame adapted to be fixed in the vacuum cleaner; and an ash tapping part, in which the ash tapping part includes a rack, a moving member, a gear and a tapping member, two ends of the rack are fixed to the fixing frame, the moving member is movably disposed to the rack, the gear is disposed to the moving member and meshes with the rack, the tapping member is disposed to the gear through a connecting shaft so as to be driven to rotate by the gear, and the tapping member is configured to tap the filtration member during rotation to vibrate the filtration member.

For the filtration assembly for the vacuum cleaner according to embodiments of the present disclosure, the rack is fixed to fixing frame, the gear is disposed to the moving member and meshes with the rack, the movement of the moving member is converted into the rotation of the gear by means of the meshing between the gear and the rack, the tapping member is driven to rotate by the gear, and the filtration member is tapped by the tapping member to vibrate, such that the dust on the filtration member is shaken off, the filtration member is prevented from being clogged by the dust, and further the cleaning efficiency may be improved to some extent.

Furthermore, the filtration assembly for the vacuum cleaner according to embodiments of the present disclosure may further have the following additional technical features.

Optionally, two tapping members are provided and distributed at two axial sides of the gear, and each tapping member is disposed to the gear through the connecting shaft.

Specially, the connecting shaft of the two tapping members is defined by a straight shaft running through the gear.

In specific embodiments of the present disclosure, the tapping member includes a connecting portion and a protruding portion, the connecting portion is connected to the connecting shaft, the protruding portion extends outwardly from an outer circumferential wall of the connecting portion, and when the tapping member rotates, the protruding portion is in contact with or in separation from the filtration member to tap the filtration member.

Preferably, a plurality of protruding portions are provided and spaced apart on the connecting portion around a rotation axis of the tapping member.

Preferably, the plurality of protruding portions are evenly spaced apart.

Specially, the moving member includes a fitting portion and a toggling portion, a sliding track movably fitted with the rack is defined in the fitting portion, the toggling portion is disposed on the fitting portion and defines an accommodating space in communication with the sliding track, and the gear is disposed in the accommodating space.

Specially, the filtration member is a HEPA paper.

Optionally, the fixing frame is configured to have an annular shape, and the rack is disposed in a center of the fixing frame.

In addition, the present disclosure further discloses a vacuum cleaner, which includes the foregoing filtration assembly for the vacuum cleaner.

For the vacuum cleaner according to embodiments of the present disclosure, by using the above filtration assembly, the cleaning of the filtration member can be conveniently achieved, such that the cleaning efficiency can be improved to some extent.

REFERENCE NUMERALS

Figure 1:
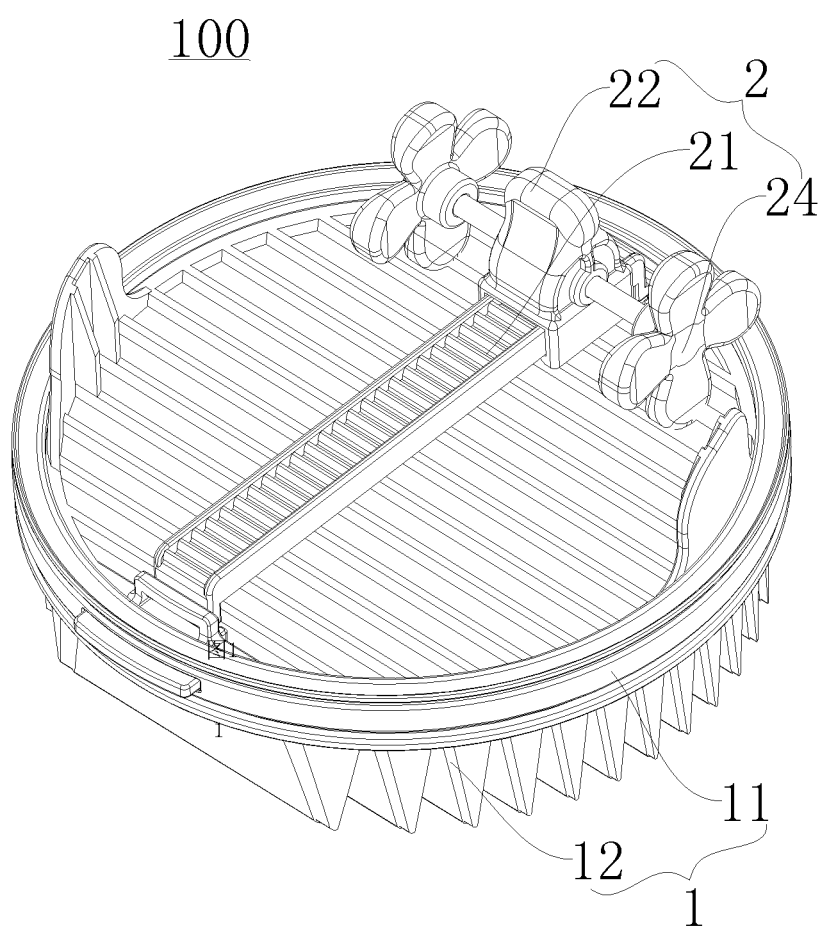
FIG. 1 is an assembly view of a filtration assembly for a vacuum cleaner according to an embodiment of the present disclosure.

100: filtration assembly; 200: main unit; 300: vacuum cleaner;
1: filtration member;
11: fixing frame; 12: fold;
2: ash tapping part;
21: rack; 22: moving member; 23: gear; 24: tapping member;
221: fitting portion; 222: toggling portion; 223: through hole;
241: connecting shaft; 242: connecting portion; 243: protruding portion; 244: mounting hole;
2211: sliding track; 2212: shrinkage;
2221: accommodating space; 2222: holding portion.

DETAILED DESCRIPTION

Embodiments of the present disclosure will be described in detail below, and examples of the embodiments are shown in accompanying drawings. The embodiments described herein with reference to drawings are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

A filtration assembly 100 for a vacuum cleaner according to embodiments of the present disclosure will be described in detail below with reference to FIGS. 1 to 6.

Figure 2:
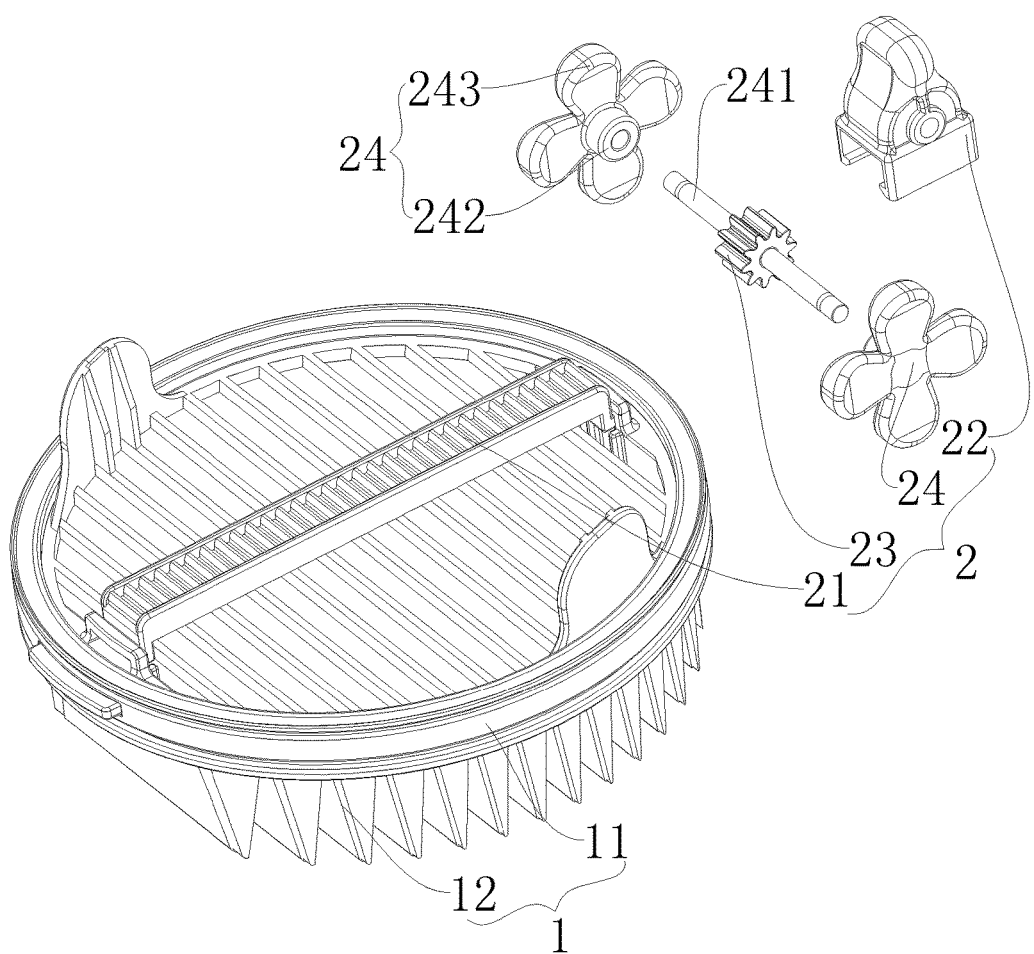
FIG. 2 is an exploded view of a filtration assembly for a vacuum cleaner according to an embodiment of the present disclosure.
Figure 3:
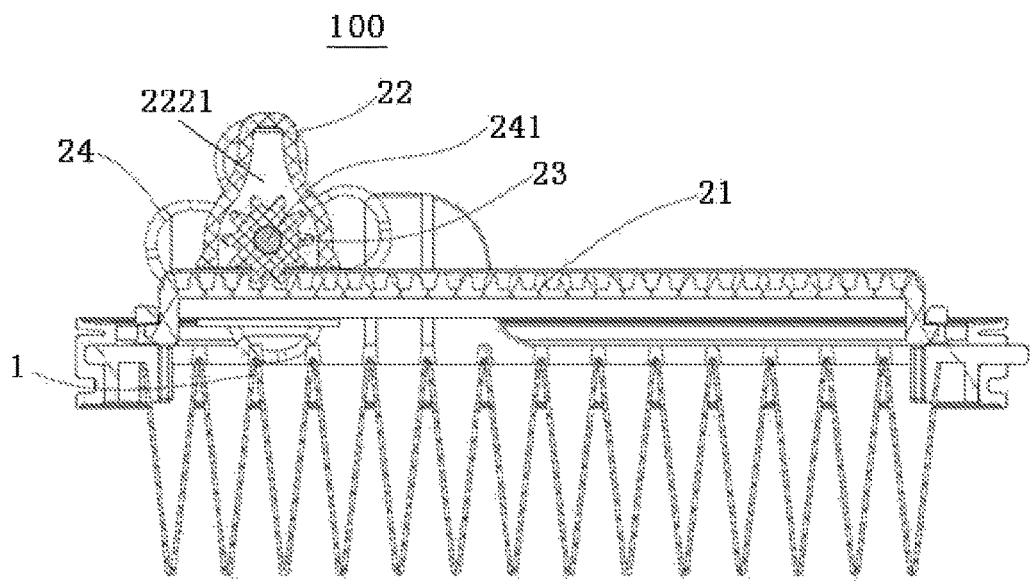
FIG. 3 is a sectional view of a filtration assembly for a vacuum cleaner according to an embodiment of the present disclosure.

As shown in FIGS. 1 and 2 in combination with FIG. 3, the filtration assembly 100 for the vacuum cleaner according to embodiments of the present disclosure may include a filtration member 1 and an ash tapping part 2.

Specifically, the filtration member 1 is used to filter an impurity, the impurity (such as dust) drawn into a vacuum cleaner 300 may be filtered by the filtration member 1 during the use of the vacuum cleaner 300. As shown in FIG. 1, an outer wall of the filtration member 1 may be provided with a fixing frame 11, and the filtration assembly 100 may be fixed in a main unit 200 of the vacuum cleaner 300 through the fixing frame 11 to carry out the cleaning function.

As shown in FIGS. 1 to 3, the ash tapping part 2 may include a rack 21, a moving member 22, a gear 23 and a tapping member 24.

Specifically, as shown in FIG. 1, two ends of the rack 21 may be fixed to the fixing frame 11, the moving member 22 may be disposed to the rack 21, and the moving member 22 is movable relative to the rack 21. As shown in FIG. 3, the gear 23 may be disposed to the moving member 22, and the gear 23 and the rack 21 can mesh. Thus, when the moving member 22 provided with the gear 23 moves on the rack 21, the gear 23 meshes with the rack 21 to convert the movement of the moving member 22 into the rotation of the gear 23, so as to carry out the subsequent ash tapping action. Furthermore, by means of the meshing movement between the gear 23 and the rack 21, the wear during a translation movement may be reduced, such that it is possible to avoid getting stuck or becoming loose and tensionless to some extent.

As shown in FIG. 1, the tapping member 24 may be disposed to the gear 23 through a connecting shaft 241, the tapping member 24 can be driven to rotate when the gear 23 rotates, and the filtration member 1 may be tapped to vibrate when the tapping member 24 rotates, such that the dust on the filtration member 1 may fall off due to the vibration, and a normal operation of the vacuum cleaner 300 is ensured.

In the filtration assembly 100 for the vacuum cleaner according to embodiments of the present disclosure, the outer wall of the filtration member 1 is provided with the fixing frame 11, the two ends of the rack 21 are fixed to the fixing frame 11, the moving member 22 provided with the gear 23 is movably disposed to the rack 21, and the tapping member 24 is disposed to the gear 23, such that the movement of the moving member 22 is converted into the rotation of the gear 23 by means of the meshing between the gear 23 and the rack 21, and the tapping member 24 is driven to rotate; the filtration member 1 is tapped to vibrate by the tapping member 24, and the dust on the filtration member 1 is shaken off, such that the normal filtration of the filtration member 1 is ensured and further the cleaning effect is improved to some extent.

Meanwhile, an interference fit occurs between the filtration member 1 and the tapping member 24 when the filtration member 1 is tapped, and the tapping member 24 needs to overcome a larger force to rotate, which causes greater instability. The filtration assembly 100 according to the present disclosure can buffer the force of tapping the filtration member 1 by converting the translation movement of the moving member 22 into the rotation movement and by the meshing movement between the gear 23 and the rack 21, which has a great buffering effect, such that it is possible to ensure stability of the translational slide of the moving member 22 on the rack 21, reduce the wear during the translation movement of the moving member 22, avoid getting stuck or avoid becoming loose and tensionless due to an increased fit clearance between the moving member 22 and the rack 21 resulting from the wear, thereby enhancing the cleaning efficiency of the filtration member 1.

The ash tapping part 2 according to embodiments of the present disclosure will be described in detail below in combination with FIGS. 1 to 4.

As an alternative embodiment, as shown in FIG. 1, two tapping members 24 may be provided, and the two tapping members 24 may be distributed at two axial sides of the gear 23, that is, the two tapping members 24 are symmetrically distributed with respect to the gear 23, and each tapping member 24 may be disposed to the gear 23 through the connecting shaft 241, such that the gear 23 can drive the tapping member 24 to rotate. Thus, not only the balance can be ensured, but also the ash tapping effect of the ash tapping part 2 can be enhanced by the simultaneous action of the two tapping members 24.

As a preferable embodiment, as shown in FIGS. 1 and 2 in combination with FIG. 3, the connecting shafts 241 of the two tapping members 24 may be defined by a straight shaft running through the gear 23, that is to say, the straight shaft runs through two ends of the gear 23 to define two connecting shafts 241 of the two tapping members 24. Thus, when the gear 23 meshes with the rack 21, the gear 23 converts the movement of the moving member 22 into its own rotation, such that the straight shaft is driven to rotate, and further the two tapping members 24 are driven to tap the filtration member 1, which can be assembled easily and conveniently, and can operate reliably.

Figure 4:
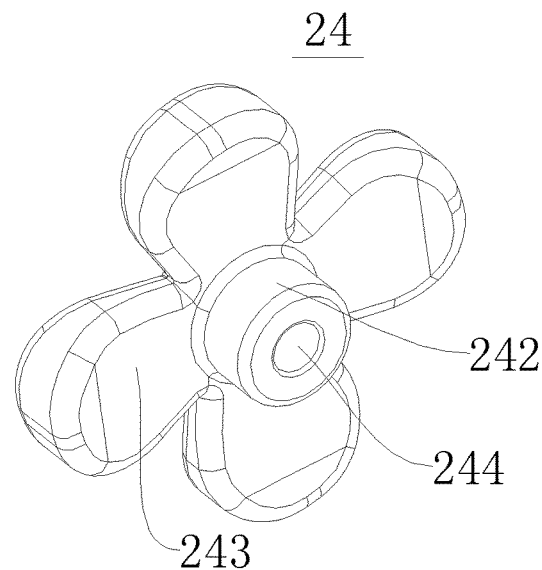
FIG. 4 is a schematic view of a tapping member of a filtration assembly for a vacuum cleaner according to an embodiment of the present disclosure.

As shown in FIGS. 2 and 4, the tapping member 24 may include a connecting portion 242 and a protruding portion 243, in which, the connecting portion 242 may be connected to the connecting shaft 241. For example, as shown in FIGS. 2 and 4, a mounting hole 244 for mounting the connecting shaft 241 is defined in the connecting portion 242, and an end of the connecting shaft 241 is fitted in the mounting hole 244, such that when the connecting shaft 241 rotates, the tapping member 24 may be driven to rotate, so as to further carry out the tapping and dedusting of the filtration member 1.

As for the protruding portion 243, as shown in FIG. 2, the protruding portion 243 may extend outwardly from an outer circumferential wall of the connecting portion 242. Specifically, the protruding portion 243 is formed on an outer circumferential surface of the connecting portion 242, and the protruding portion 243 extends outwardly in a radial direction of the connecting portion 242, as shown in FIGS. 2 and 4.

When the tapping member 24 rotates, the protruding portion 243 may be in contact with or in separation from the filtration member 1. That is, during the rotation, the protruding portion 243 sometimes is in contact with the filtration member 1 and sometimes separated from the filtration member 1, so as to carry out the tapping of the filtration member 1, thereby vibrating the filtration member 1. Thus, the dirt such as the dust adhered to the filtration member 1 will be separated from the filtration member 1 due to vibration, such that the dedusting of the filtration member 1 can be achieved, and the cleaning efficiency can be improved to some extent.

As a preferable embodiment, as shown in FIG. 2, a plurality of protruding portions 243 may be provided. For example, as shown in FIG. 2 in combination with FIG. 4, four protruding portions 243 may be provided, and the plurality of protruding portions 243 are spaced apart on the connecting portion 242 around a rotation axis of the tapping member 24. Thus, since the filtration member 1 is tapped by the plurality of protruding portions 243, the ash tapping efficiency of the tapping member 24 can be improved. Meanwhile, since the plurality of protruding portions 243 are spaced apart from each other, the dedusting effect can be enhanced to some extent. More preferably, the plurality of protruding portions 243 are evenly spaced apart.

Figure 5:
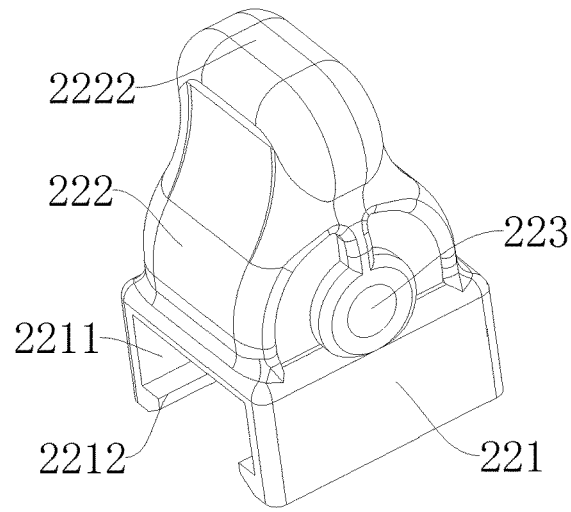
FIG. 5 is a schematic view of a moving member of a filtration assembly for a vacuum cleaner according to an embodiment of the present disclosure.

According to some embodiments of the present disclosure, as shown in FIGS. 1, 2 and 5, the moving member 22 may include a fitting portion 221 and a toggling portion 222, in which, the fitting portion 221 is used to be fitted with the rack 21. As shown in FIG. 2, a sliding track 2211 in which the rack 21 is moved may be defined in the fitting portion 221, two ends of the fitting portion 221 in a length direction of the rack 21 are provided with an opening separately, an end of the rack 21 may enter the fitting portion 221 through one opening, as shown in FIG. 1, and the other end of the rack 21 leaves the fitting portion 221 through the other opening. Thus, the rack 21 can be conveniently and reliably fitted with the fitting portion 221 to carry out the subsequent ash tapping and dedusting action.

Preferably, a shrinkage 2212 may be formed in a surface of the fitting portion 221 adjacent to the filtration member 1, as shown in FIGS. 2 and 5, and a width of the shrinkage 2212 may be slightly smaller than a width of the rack 21. On the one hand, when in use, the rack 21 is fitted in the sliding track 2211 of the fitting portion 221 to slide, such that the rack 21 can be prevented from being dislocated and derailing by means of the shrinkage 2212 to ensure the normal operation of the filtration assembly 100; on the other hand, when the filtration assembly 100 is required for maintenance, the rack 21 may be removed through the shrinkage 2212 to detach the fitting portion 221 from the rack 21, which is simple and effortless.

The toggling portion 222 may be disposed on the fitting portion 221, as shown in FIGS. 2, 3 and 5, an end of the toggling portion 222 adjacent to the rack 21 is connected to the fitting portion 221, and an accommodating space 2221 in communication with the sliding track 2211 may be defined in the toggling portion 222. In other words, the toggling portion 222 is in communication with the sliding track 2211 in the fitting portion 221 to form a hollow structure, and the gear 23 may be disposed in the accommodating space 2221.

It should be understood that, the minimum size of the accommodating space 2221 should be greater than the maximum size of the gear 23, such that the gear 23 may mesh with the rack 21 in the accommodating space 2221, and may be rotated to drive the tapping member 24 to tap the filtration member 1 for ash tapping and dedusting.

As a preferable embodiment, the toggling portion 222 may be provided with a holding portion 2222, as shown in FIGS. 3 and 5, and the holding portion 2222 may be constructed by a portion of the toggling portion 222 away from the rack 21. Thus, the user can conveniently move the moving member 22 along the rack 21 by holding the holding portion 2222, convert the movement into the rotation of the gear 23 by means of the meshing of the gear 23 and the rack 21, hence drive the tapping member 24 to rotate and further to vibrate the filtration member 1, so as to achieve the cleaning of the filtration member 1.

It should be understood that, the moving member 22 is provided with through holes 223 distributed symmetrically, the connecting shaft 241 runs through the through holes 223 and protrudes from the accommodating space 2221 through the through holes 223 so as to connect the gear 23 and the tapping member 24.

In general, for the ash tapping part 2 according to embodiments of the present disclosure, the two tapping members 24 are distributed on the two axial sides of the gear 23 and connected through the connecting shaft 241, so as to be driven to rotate; the plurality of protruding portions 243 are spaced apart and distributed on the connecting portion 242, such that the protruding portion 243 can be in contact with or be in separation from the filtration member 1; and the sliding track 2211 is defined in the fitting portion 221, the toggling portion 222 is disposed on the fitting portion 221, and the accommodating space 2221 is defined in the toggling portion 222 to mount the gear 23 in the accommodating space 2221; by providing the holding portion 2222 on the toggling portion 222, the user can conveniently move the moving member 22 by holding the holding portion 2222 to mesh the gear 23 with the rack 21; the movement of the moving member 22 is converted into the rotation of the gear 23 to drive the tapping member 24 to rotate, and the filtration member 1 is vibrated by intermittent contact and separation between the tapping member 24 and the filtration member 1; such that the ash tapping and the dedusting of the filtration member 1 is achieved, the filtration member 1 is prevented from being clogged by the dust, and further the cleaning efficiency is improved to some extent.

The filtration member 1 according to embodiments of the present disclosure will be described in detail below in combination with FIGS. 1 to 5.

The filtration member 1 may be used to filter the impurity. When the vacuum cleaner 300 is in operation, the air containing the impurity (such as the dust) are drawn into the main unit 200, and after filtered by the filtration assembly 100, the clean air can be discharged from the main unit 200 through the filtration assembly 100, while the impurity (such as the dust) are retained in the main unit 200 by the filtration member 1, such that the vacuuming and cleaning operation is completed.

As an alternative embodiment, the filtration member 1 may be a HEPA paper, when the air containing the impurity (such as the dust) passes the HEPA paper, and it can be effectively filtered by the HEPA paper. Most of fine particles in the air are retained in the main unit 200, while the air is purified and discharged through the filtration assembly 100, thereby completing the cleaning.

As a preferable embodiment, as shown in FIGS. 1 to 3, the HEPA paper may be corrugated, that is, the HEPA paper may have folds 12. Thus, when the moving member 22 is moved on the rack 21, the gear 23 can drive the tapping member 24 to tap the HEPA paper. Since the HEPA paper has the folds 12 and the interference fit occurs when the tapping member 24 taps the HEPA paper, a larger force is required to rotate the tapping member 24, while the meshing movement between the gear 23 and the rack 21 has a great buffering effect, such that the tapping member 24 can intermittently contact the HEPA paper, the stability of the movement of the moving member 22 is ensured, and further the ash tapping and dedusting effect is improved to some extent.

More preferably, an extending direction of the fold 12 of the HEPA paper is perpendicular to an extending direction of the rack 21, that is to say, the rack 21 is arranged perpendicular to the HEPA paper. Thus, when the moving member 22 is pushed to move by the user, the gear 23 meshes with the rack 21 to convert the movement into the rotation, and the tapping member 24 is moved along the rack 21 while the tapping member 24 is rotated. Thus, the tapping member 24 can intermittently tap most of the folds 12 of the HEPA paper, such that the ash tapping and dedusting effect is better.

Figure 6:
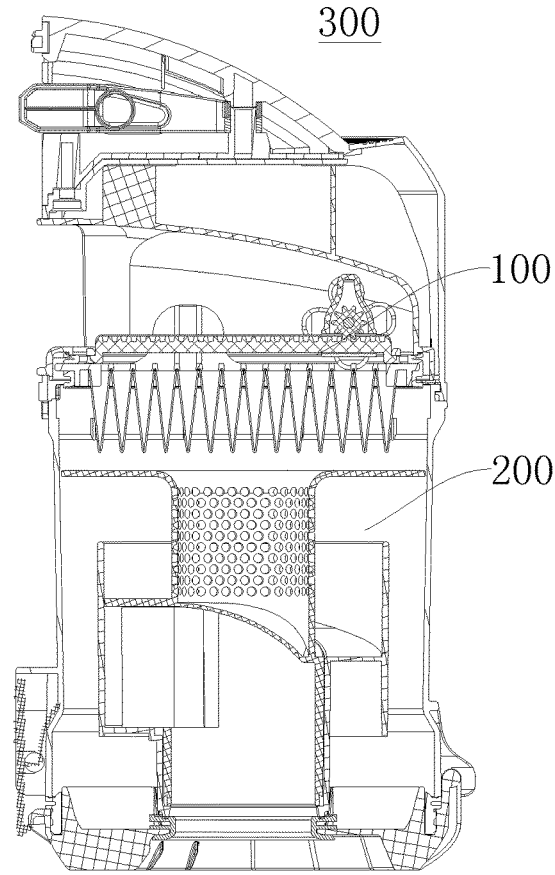
FIG. 6 is a schematic view of a vacuum cleaner according to an embodiment of the present disclosure.

According to one embodiment of the present disclosure, the outer wall of the filtration member 1 is provided with the fixing frame 11, as shown in FIGS. 1 and 2, and the fixing frame 11 may be configured to have an annular shape. On the one hand, the fixing frame 11 may fix the HEPA paper on the fixing frame 11, the HEPA paper is prevented form deforming when in use; on the other hand, as shown in FIG. 6, the whole filtration assembly 100 may be conveniently fixed in the main unit 200 of the vacuum cleaner 300 through the fixing frame 11, which can not only make the vacuum cleaner 300 concise and beautiful, but also reduce its probability of being damaged to extend its service life.

In a specific example of the present disclosure, as shown in FIG. 1 in combination with FIG. 2, the two ends of the rack 21 may be fixed to the fixing frame 11, such that the rack 21 is prevented from moving. Certainly, it should be understood that, the rack 21 may also be connected to the fixing frame 11 through a threaded connection, so as to facilitate the removal of the rack 21. Certainly, the rack 21 may also be snap-fitted to two ends of the fixing frame 11, which saves the material and may be processed simply. The specific connection form of the rack 21 and the fixing frame 11 is determined by comprehensively considering the connection effect, the cost, the manufacturing process and etc., which is not specifically limited by the present disclosure.

Preferably, the rack 21 may be disposed in a center of the fixing frame 11, in other words, the rack 21 may be parallel to one diameter of a sectional circle of the annular fixing frame 11, as shown in FIGS. 1 and 2. Thus, the filtration assembly 100 may be configured to have a symmetric structure, which has a better balance and stability, such that the probability of damage may be reduced to some extent, so as to extend the service life.

In general, for the filtration member 1 according to embodiments of the present disclosure, the HEPA paper is fixed to the vacuum cleaner 300 by the annular fixing frame 11, and the folds 12 of the HEPA paper are disposed perpendicular to the rack 21; the two ends of the rack 21 are connected to the fixing frame 11, and the rack 21 is disposed in the center of the fixing frame 11 to configure the filtration assembly 100 to have the symmetric structure; the tapping member 24 intermittently taps most of the folds 12 of the HEPA paper to obtain a better ash tapping and dedusting effect and meanwhile to obtain better stationarity of the filtration assembly 100, which can not only make the vacuum cleaner 300 concise and beautiful, but also reduce the probability of being damaged to extend the service life.

In conclusion, for the filtration assembly 100 for the vacuum cleaner according to embodiments of the present disclosure, the outer wall of the HEPA paper is provided with the annular fixing frame 11, and the two ends of the rack 21 are fixed to the fixing frame 11; the toggling portion 222 internally provided with the gear 23 is disposed on the fitting portion 221 having the sliding track 2211, so as to mesh the gear 23 with the rack 21 in the accommodating space 2221 of the toggling portion 222; the movement of the moving member 22 is converted into the rotation of the gear 23, and the gear 23 further drives the tapping member 24 connected to the connecting shaft 241; the plurality of protruding portions 243 spaced apart are configured to intermittently tap the HEPA paper, the HEPA paper is provided with folds 12, and the plurality of protruding portions 243 are in contact with or is in separation from the folds 12 of the HEPA paper to vibrate the HEPA paper, such that the impurity (such as the dust) adhered to the HEPA paper are vibrated to fall off; and the filtration assembly 100 is configured to have the symmetric structure to obtain better balance and stability, which can not only make the vacuum cleaner 300 concise and beautiful, but also prevent the HEPA paper from being clogged by the dust, such that the cleaning efficiency is improved and meanwhile the service life is extended.

In addition, the present disclosure further discloses a vacuum cleaner 300, which includes the foregoing filtration assembly 100, and the filtration assembly 100 may be mounted in the main unit 200 of the vacuum cleaner 300.

It should be understood that, other constitutions of the vacuum cleaner 300 according to embodiments of the present disclosure have existed in the related art and are well known by those skilled in the art, which thus will not be described herein.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A filtration assembly for a vacuum cleaner, comprising:
    a filtration member used for filtering an impurity, an outer circumferential wall of the filtration member being provided with a fixing frame, and the fixing frame being configured to be fixed in the vacuum cleaner; and
    an ash tapping part comprising a rack, a moving member, a gear and a tapping member, wherein two ends of the rack are fixed to the fixing frame, the moving member is movably disposed to the rack, the gear is disposed to the moving member and meshes with the rack, the tapping member is disposed to the gear through a connecting shaft, so as to be driven to rotate by the gear, and the tapping member is configured to tap the filtration member during rotation to vibrate the filtration member,
    wherein the moving member comprises a fitting portion and a toggling portion, a sliding track movably fitted with the rack is defined in the fitting portion, the toggling portion is disposed on the fitting portion and defines an accommodating space in communication with the sliding track, and the gear is disposed in the accommodating space.

2. The filtration assembly according to claim 1, wherein two tapping members are provided and distributed at two axial sides of the gear, and each tapping member is disposed to the gear through the connecting shaft.

3. The filtration assembly according to claim 2, wherein the connecting shaft of the two tapping members is defined by a straight shaft running through the gear.

4. The filtration assembly according to claim 1, wherein the tapping member comprises a connecting portion and a protruding portion, the connecting portion is connected to the connecting shaft, the protruding portion extends outwardly from an outer circumferential wall of the connecting portion, and when the tapping member rotates, the protruding portion is in contact with or is in separation from the filtration member to tap the filtration member.

5. The filtration assembly according to claim 4, wherein a plurality of protruding portions are provided and spaced apart on the connecting portion around a rotation axis of the tapping member.

6. The filtration assembly according to claim 5, wherein the plurality of protruding portions are evenly spaced apart.

7. The filtration assembly according to claim 1, wherein the filtration member is a HEPA paper.

8. The filtration assembly according to claim 1, wherein the fixing frame is configured to have an annular shape, and the rack is disposed in a center of the fixing frame.

9. A vacuum cleaner, comprising:
    a filtration assembly, comprising:
    a filtration member used for filtering an impurity, an outer circumferential wall of the filtration member being provided with a fixing frame, and the fixing frame being configured to be fixed in the vacuum cleaner; and
    an ash tapping part comprising a rack, a moving member, a gear and a tapping member, wherein two ends of the rack are fixed to the fixing frame, the moving member is movably disposed to the rack, the gear is disposed to the moving member and meshes with the rack, the tapping member is disposed to the gear through a connecting shaft, so as to be driven to rotate by the gear, and the tapping member is configured to tap the filtration member during rotation to vibrate the filtration member,
    wherein the moving member comprises a fitting portion and a toggling portion, a sliding track movably fitted with the rack is defined in the fitting portion, the toggling portion is disposed on the fitting portion and defines an accommodating space in communication with the sliding track, and the gear is disposed in the accommodating space.

* * * * *